F. WOOLLARD.
PEDAL LOCK FOR AUTOMOBILES.
APPLICATION FILED AUG. 9, 1918.
1,414,390.
Patented May 2, 1922.
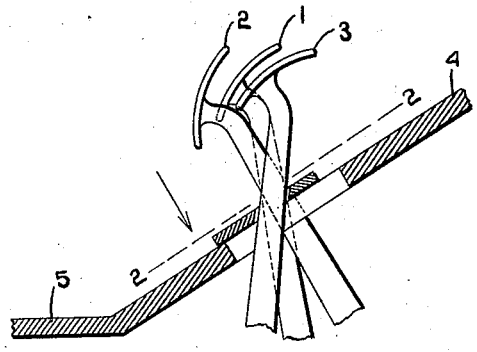
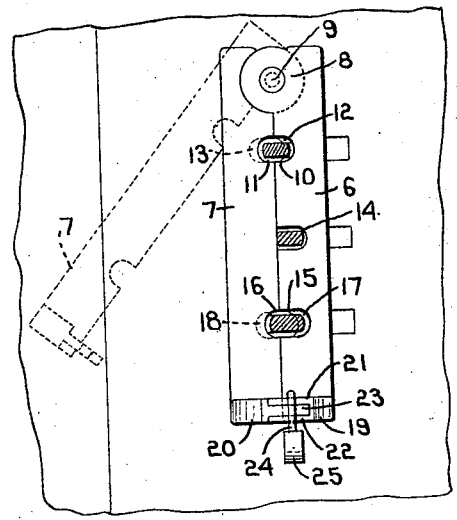
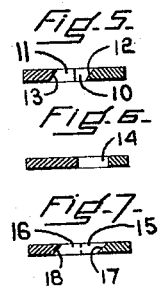
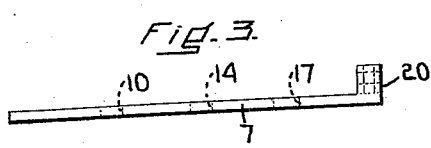
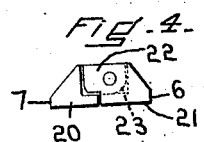
Inventor:
Frank Woollard
By Heard Smith & Tennant
His Attorneys

UNITED STATES PATENT OFFICE.

FRANK WOOLLARD, OF BILLERICA, MASSACHUSETTS, ASSIGNOR OF ONE-HALF TO GUY L. WOOLLARD, OF BOSTON, MASSACHUSETTS.

PEDAL LOCK FOR AUTOMOBILES.

1,414,390.   Specification of Letters Patent.   Patented May 2, 1922.

Application filed August 9, 1918. Serial No. 249,049.

*To all whom it may concern:*

Be it known that I, FRANK WOOLLARD, a citizen of the United States, and resident of Billerica, county of Middlesex, State of Massachusetts, have invented an Improvement in Pedal Locks for Automobiles, of which the following description, in connection with the accompanying drawing, is a specification, like characters on the drawing representing like parts.

This invention relates to improvements in pedal locking mechanisms for automobiles and the object thereof is to provide a lock which can be quickly applied to the pedals of an automobile and which when applied will lock the mechanisms for operating the machine in such positions as to prevent the automobile from bing propelled in either direction by its engine or from being pushed or towed forwardly. In fact the lock is so designed as to prevent the turning over of the engine, thereby avoiding any possible injury to the driving mechanism from the power which might otherwise be obtained from the engine.

The invention herein disclosed is illustrated as applied to the pedal mechanism of an automobile of the well known Ford type and comprises locking means adapted to secure the high gear in mesh with the driving gear, the reverse gear in mesh with the driving gear and the brake pedal on, that is, in braking position or with the service brake partially applied.

A further object of the invention is to provide a pedal lock of the character above specified which will not only lock the pedals in the manner aforesaid but will also lock the foot board against removal thereby preventing access to the power controlling and transmitting mechanism.

A further object of the invention is to provide a pedal lock of the character specified which cannot be removed by filing or sawing.

Other objects and features of the invention will more fully appear from the following description and accompanying drawings and will be pointed out in the annexed claim.

In the drawings,

Fig. 1 illustrates diagrammatically the position of the floor board of a Ford automobile with the clutch, reverse and brake levers locked in such a manner as to prevent the starting up of the automobile or its removal by pushing or towing, Fig. 2 is a plan view showing the controlling levers in section on line 2—2 Fig. 1, Fig. 3 is a side elevation of the locking plate, Fig. 4 is an end elevation of the locking plate showing the tongue and groove connection between the parts thereof, Fig. 5 is a transverse sectional view of the locking plate taken through the aperture in which the clutch lever is adapted to be locked, Fig. 6 is a similar view taken through the aperture in which the reverse lever is locked, and, Fig. 7 is a transverse sectional view through the aperture in which the brake lever is locked.

The controlling mechanisms for automobiles of the Ford type are so well known that it is unnecessary to illustrate the same in connection with the accompanying invention, it being sufficient to illustrate the positions of the clutch, reverse and brake levers when locked in position to prevent the automobile from being operated either under its own power or pushed or towed away in a forward direction.

Fig. 1 illustrates the three main controlling levers of a Ford automobile, the lever 1 being the clutch and gear shift lever which when in its normal position, that is, drawn back toward the right, causes the engagement of the high gear with the driving gear which is operated by the engine. 2 is the reverse lever which normally is held by a spring forward or to the left of the position illustrated in Fig. 1 but when pushed into the position illustrated herein tightens the reverse gear transmission band. 3 is a brake lever which when in normal position is retracted toward the left by a suitable spring but when in the position illustrated in Fig. 1 is in position to apply the brake partially. These levers extend upwardly through the floor board at different angles to the plane of the same.

The levers 1 and 3 incline forwardly, that is, toward the right, while the reverse lever 2 inclines backwardly, that is to the left. The floor board 4 of the automobile is inclined forwardly from the plane of the floor 5 of the machine in the customary manner.

The pedal locking means comprises a two-part plate consisting of flat sections 6 and 7 having overlapping circular portions 8 which are secured together by a rivet 9 in a manner similar to that in which portions of a folding rule are secured together. The sections 6 and 7 of the plate are provided with recesses of such a character that when the edges of said sections are secured together the apertures will be in substantially the alinement illustrated in Fig. 2 of the drawing.

The rivet which secures the circular portions 6 and 7 of the plate together desirably is countersunk so that it cannot be cut off from the upper side by a chisel, saw or file.

The adjacent edges of the sections 6 and 7 of the plate are provided with complementary apertures 10, 11 having inclined end walls 12, 13 which embrace tightly the edges of the clutch and gear shaft lever 1. The section 6 is also provided with a recess 14 to receive and fit the reverse lever and lock the same against the inner edge of the plate 7.

The sections 6 and 7 are also provided with complementary recesses 15, 16 having inclined walls 17 and 18 respectively to fit the edges of the brake lever 3 and to hold the same, when the edges of the sections are together, in braking position. The outer or free ends of the sections 6 and 7 of the locking device are provided with upwardly extending integral lugs or flanges 19, 20, the flange 19 extending over the edge thereof a considerable distance and being slotted or bifurcated to present parallel walls 21, 22 forming in effect a mortise to receive a tongue or tenon 23 upon the other flange member 20.

The walls 21, 22 of the member 19 and the tenon 23 of the member 20 are provided with alined apertures to receive the hasp 24 of a suitable padlock 25.

In the operation of the device the automobile is first brought to a stand-still and the engine stopped. The clutch and low speed lever 1 is then placed in its extreme position to the right, thereby to throw the clutch in and connect the engine to the drive shaft through the high speed gear. The locking plate with its members 6 and 7 spread apart as indicated in dotted lines in Fig. 2 is then slipped over the levers and the reverse lever 2 and brake lever 3 are pressed forwardly by the locking plate until the member 6 can be rotated about the pivot 9 sufficiently to lock the levers 1, 2 and 3 in substantial alinement. When the reverse lever and brake lever are in their forward position the reverse transmission band and the service brake band are both applied to a greater or less extent. The hasp 24 of the lock 25 is thereupon thrust through the aperture and locked in the usual manner. By reason of the inclination of the end walls 12, 13 of the aperture which receives the clutch and low speed lever 1 and the opposite inclination of the walls of the aperture 14 which receives the reverse lever and finally the inclination of the walls 17, 18 of the aperture which receives the brake lever the positioning of these foot pedals in alinement in the positions heretofore mentioned is assured and the locking of the automobile against forward movement by its own power or otherwise is prevented.

By reason of the fact that the end walls of the recess for the reverse lever incline in an opposite direction from the end walls of the recesses which receive the clutch and low speed lever and the brake lever the locking bolt is held securely down upon the footboard 4 so that the latter cannot be removed to permit access to the interior mechanism.

The locking plate is of simple construction and may be made from cast iron, cold forged iron or steel or of any suitable material. By reason of the fact that it lies flat against the floor board it is quite inaccessible to the use of a saw or other device which might be used to remove it. Furthermore, the interlocking portions of the upstanding flanges upon the free ends of the sections 5 and 6 of the locking plate may be made integral with the plate and so constructed as to render it quite difficult to saw through the mortise joint, particularly when the hasp of the lock has been inserted through the aperture therein.

It will be understood that the present embodiment of the invention is of an illustrative character and that various modifications may be made within the meaning and scope of the following claim. It will also be understood that my invention is applicable to other forms of pedal mechanisms for automobiles and that the invention contemplates broadly a pedal lock so constructed as to lock the automobile against removal either under its own power or extraneous power.

Having thus described my invention what I claim as new and desire to secure by Letters Patent is:

A pedal lever lock for automobiles comprising a plate formed in two sections having abutting edges and at one end overlapping circular portions secured together by a countersunk pivotal connection, and at the opposite end having upwardly extending flanges provided respectively with a mortise and a complementary tenon adapted to be interengaged when the adjacent edges of the sections are juxtaposed, recesses in said sections extending from the abutting edges thereof adapted to receive the pedal levers of the automobile and hold them in substantial alinement and means for locking the flanges together including alined apertures in the walls of the mortise and the tenon adapted to receive the hasp of a padlock.

In testimony whereof, I have signed my name to this specification.

FRANK WOOLLARD.